United States Patent [19]

Spease

[11] Patent Number: 4,625,579
[45] Date of Patent: Dec. 2, 1986

[54] CAPPED CORE ELEMENT TERMINAL

[75] Inventor: Arthur L. Spease, Livonia, Mich.

[73] Assignee: Teleflex Incorporated, Limerick, Pa.

[21] Appl. No.: 675,775

[22] Filed: Nov. 28, 1984

[51] Int. Cl.$^4$ ................................................. F16C 1/14
[52] U.S. Cl. ............................ 74/501 R; 74/501.5 R;
74/501 P; 403/11; 403/361
[58] Field of Search .......... 74/501 R, 501 P, 501.5 R;
403/11, 18, 122, 132, 133, 134, 135, 141, 316,
317, 140, 361

[56] References Cited

U.S. PATENT DOCUMENTS

| | | | |
|---|---|---|---|
| 3,787,127 | 1/1974 | Cutler | 403/140 |
| 4,111,570 | 9/1978 | Morel | 403/18 |
| 4,499,785 | 2/1985 | Bennett et al. | 74/501 R |

Primary Examiner—George L. Walton
Attorney, Agent, or Firm—Harold W. Milton, Jr.

[57] ABSTRACT

A motion transmitting remote control assembly (10) of the type for transmitting motion in a curved path includes a terminal member (20) for operatively interconnecting an extending length of a core element and a control member (22). The control member (22) has a body portion (32) and a ball pin (36) extending therefrom. The terminal member (20) includes a passageway (38) defining an opening having a central longitudinal axis and a plurality of flexible fingers (40) defining a portion of the passageway (38). The flexible fingers (40) have an engaged condition for engaging and retaining the ball pin (36) disposed within the passageway (38) and a disengaged condition for releasing the ball pin (36). The assembly (10) is characterized by including a cap member (42) for radially outwardly spreading the fingers (40) to the disengaged condition during insertion and removal of the ball pin (38).

12 Claims, 5 Drawing Figures

CAPPED CORE ELEMENT TERMINAL

TECHNICAL FIELD

The instant invention relates to a motion transmitting remote control assembly of the type for transmitting motion in a curved path.

BACKGROUND ART

Motion transmitting remote control assemblies of the type for transmitting motion in a curved path are commonly used in many automotive actuating applications. For example, such motion transmitting remote controls are used as automatic transmission controls. The assembly generally includes a core element supported within a guide, the core element having a portion extending therefrom to provide a variably extending length. A terminal member is mounted on the end of the core element for operatively connecting the core element to a control member. A common type of control member presently used in the automotive industry includes a body portion having a ball pin extending therefrom.

Various configurations of terminal members have been utilized to interconnect the ball pin to the core element. The U.S. Pat. No. 3,787,127 to Cutler, issued Jan. 22, 1974 is an example of a ball and socket joint including a plurality of flexible fingers for retaining a ball pin therein. The U.S. Pat. No. 4,111,570 to Morel, issued Sept. 5, 1978 discloses a ball and socket joint cage including a cap member for locking a ball pin within a pocket of the terminal member. The locking means fixes flexible fingers defining the socket joint cage about a ball pin. The U.S. Pat. Nos. 2,096,567 to Peo, issued on Oct. 19, 1937 and 4,163,617 to Nemoto, issued Aug. 7, 1979 are other examples of ball joints including various means for retaining a ball pin within the ball joint pocket.

The copending patent application Ser. No. 392,515 to Frankhouse et al and assigned to the assignee of the instant application, discloses a novel ball joint configuration for a terminal member of a motion transmitting remote control assembly. The application discloses a motion transmitting remote control assembly including a terminal member having an opening therethrough and having containing means for containing the body portion of a control member therein and for absorbing the applied forces as the terminal member is moved along a line of force and retaining means for retaining the ball pin of the control member therein. The retaining means includes at least one flexible finger extending from the containing means defining a portion of the opening through the terminal member. As the opening through the terminal member extends completely therethrough, a problem has arisen wherein the user of the terminal member may insert the ball pin through the wrong end of the opening thereby providing a less than effective connection between the core element and the control member. In view of this problem, the instant invention provides means for preventing upside down installation of a ball pin into an opening in the terminal member. The improvement further aids terminal removal and retention.

STATEMENT OF THE INVENTION AND ADVANTAGES

According to the present invention, there is provided a motion transmitting remote control assembly of the type for transmitting motion in a curved path including guide means and core means having a peripheral end. The core means is movably supported by the guide means and extends therefrom to provide a variably extending length of the core means between the guide means and the peripheral end of the core means. The extending length defines a line of force. An integral terminal member operatively interconnects the extending length of the core means and a control member of the type having a body portion and a ball pin extending therefrom. The terminal member includes a passageway defining an opening having a central longitudinal axis perpendicular relative to the line of force and includes a plurality of flexible fingers defining a portion of the opening. The flexible fingers have an engaged condition for engaging and retaining the ball pin disposed within the opening and a disengaged condition for releasing the ball pin. The invention is characterized by finger spreading means for radially outwardly spreading the fingers to the disengaged condition during insertion and removal of the ball pin.

The instant invention aids terminal removal and retention by reducing assembly loads 50% and significantly improving retention of the ball pin within the terminal member. The instant invention further prevents upside down installation of the ball pin into the passageway of the terminal member.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

A motion transmitting remote control assembly of the type for transmitting motion in a curved path is generally shown at 10 in FIGS. 1 through 4.

Figure 1:
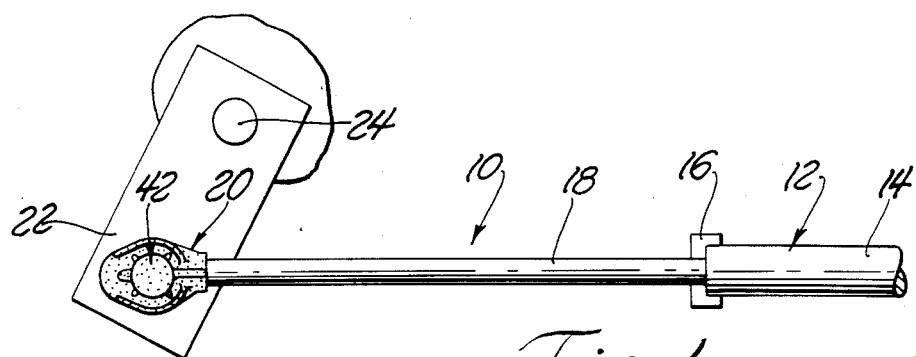
FIG. 1 is a schematic elevational view of a motion transmitting remote control assembly constructed in accordance with the instant invention.

The assembly 10 includes guide means generally indicated at 12 in FIG. 1. The guide means 12 includes a conduit (not shown) having an end portion connected to a rigid tube member 14. The tube member 14 may be connected to the conduit at a swivel joint thereby allowing swiveling movement of the tube member 14 relative to the conduit. A wiper member 16 is mounted on the end portion of the tube member 14. The asembly 10 further includes core means movably supported by the guide means 12 and extending therefrom to provide a variable length of the core means between the guide means 12 and one end of the core means.

More specifically, the core means includes a flexible core element (not shown) disposed within the conduit for reciprocating linear movement therein. The core means includes a rod member 18 is connected to an end portion of the flexible core element and extends from the tube member 14 to provide the variably extending length of the core means between the guide means 12 and that end of the rod member 18 extending from the tube member 14. The wiper 16 engages the rod member 18 to provide a seal thereabout to prevent the ingress of foreign particles into the tube member 14. The tube member 14 may be supported in a swivel joint (not shown), as is well known in the art.

The assembly 10 includes an integral terminal member generally indicated at 20 in FIGS. 1–4 for operatively interconnecting the rod member 18 and a control member 22. The control member 22 may take the form of a lever 22 which is supported upon a rotatable actuating shaft 24. The rod member 18 defines a line of force whereby, upon longitudinal movement of the rod member 18 along the line of force defined thereby, the lever 22 is rotated which, in turn, rotates the actuating shaft 24. Hence, the terminal member 20 interconnects the rod member 18 and lever 22 so as to translate the linear movement of the core means into pivoting or rotational movement of the shaft 24 via the lever 22. The terminal member 20 provides a pivoting connection of the rod member 18 to the lever 22. To accomplish this function, the lever 22 includes a projection generally indicated at 26 in FIG. 3. The projection 26 includes a neck portion 28 which may extend integrally from the lever 22 or may include a threaded portion 30 to be connected to a threaded bore in the lever 22. The projection 26 includes a cylindrical body portion 32 and a flange 34 disposed between the body portion 32 and neck 28. A ball pin 36 extends from the body portion 32.

The terminal member 20 includes a passageway 38 defining an opening having a central longitudinal axis perpendicular relative to the line of force as defined by the rod member 18.

Figure 4:
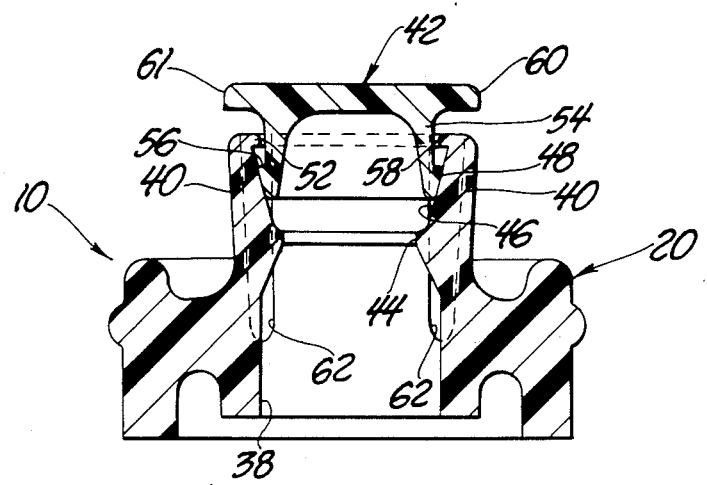
FIG. 4 is a cross sectional view taken along lines 4—4 of FIG. 2 wherein the terminal member is in the disengaged condition.
Figure 5:
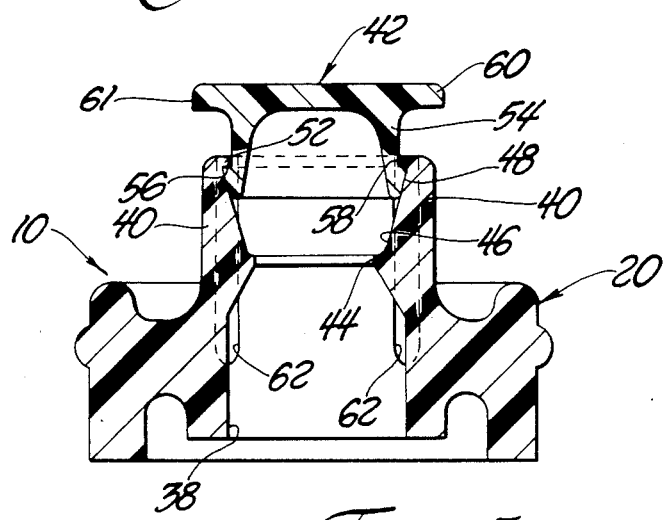
FIG. 5 is a cross sectional view taken along lines 4—4 of FIG. 2.

The terminal member 20 includes a plurality of flexible fingers 40 defining a portion of the passageway 38 and having an engaged condition as shown in FIG. 5 for engaging and retaining the ball pin 36 disposed within the passageway 38 and a disengaged condition for releasing the ball pin 36 as shown in FIG. 4. The assembly 10 is characterized by including finger spreading means generally indicated at 42 for radially outwardly spreading the fingers 40 to the disengaged condition during insertion and removal of the ball pin 36.

The fingers 40 include an inwardly protruding portion 44 defining an annular ledge about the passageway 38 for engaging and retaining the ball pin 36 in the engaged condition, the finger spreads means 42 outwardly spreading the inwardly protruding portions 44 in the disengaged condition. This is accomplished by at least some of the fingers 40 including a frustoconical inner surface 46 adjacent the inwardly protruding portions or annular ledge 44. The spreading means 42 is mounted within the passageway 38 for reciprocating movement along the central longitudinal axis and has an outer frustoconical surface 48 in sliding mating engagement with the frustoconical inner surface 46 of the fingers 40. The spreading means 42 is slidable between an inserted position spreading the fingers 40 to the disengaged condition as shown in FIG. 4 and a withdrawn position wherein the fingers are in the engaged condition as shown in FIG. 5. In other words, the finger spreading means 42 functions as a cam member or wedge which upon insertion into the passageway 38 acts against the frustoconical inner surface 46 of at least some of the fingers 40 to spread the fingers 40. In this manner, there is a significant decrease in the load necessary to insert the ball pin member 36 into the passageway 38 beyond the inwardly protruding portions or annular ledge 44 so as to retain the ball pin member 36 therein.

The passageway 38 has first and second end portions 50 and 52 respectively. The first end portion 50 defines an insert opening for receiving a ball pin 36 therethrough. The spreading means 42 comprises a cap member 42 which is mounted over the second end portion 52 to prevent insertion of the ball pin into the second end portion 52. In this manner, upside down installation of the ball pin member 36 is prevented.

The terminal member 20 includes cap retaining means for retaining the cap member 42 within the second end portion 52 of the passageway 38. The cap member 42 includes a body portion 54 having the outer frustoconical surface 48 and a shoulder 56 extending outwardly therefrom. The cap retaining means includes an annular inwardly extending flange 58 about the second end portion 52 of the passageway 38 for abutting contact with the shoulder 56 to retain the cap member 42 within the passageway 38. The cap member 42 is retained within the terminal member and is slidably movable along the longitudinal axis of the passageway 38. The flexible fingers 40 bias the cap member 42 towards the withdrawn position as shown in FIG. 5. Pressure on the outer surface of the cap member 42 forces the cap member 42 into the passageway 38. The frustoconical surface 48 provides a wedging force against the inner frustoconical surface 46 of the fingers 40 to spread the fingers 40 and separate the inwardly protruding portions 44 thereby allowing less resistance to the insertion of the ball pin member 36.

The cap member 42 includes a head portion 60 having a radially outwardly extending flange 61. The body portion 54 of the cap member 42 comprises a substantially cylindrical flexible wall.

Figure 2:
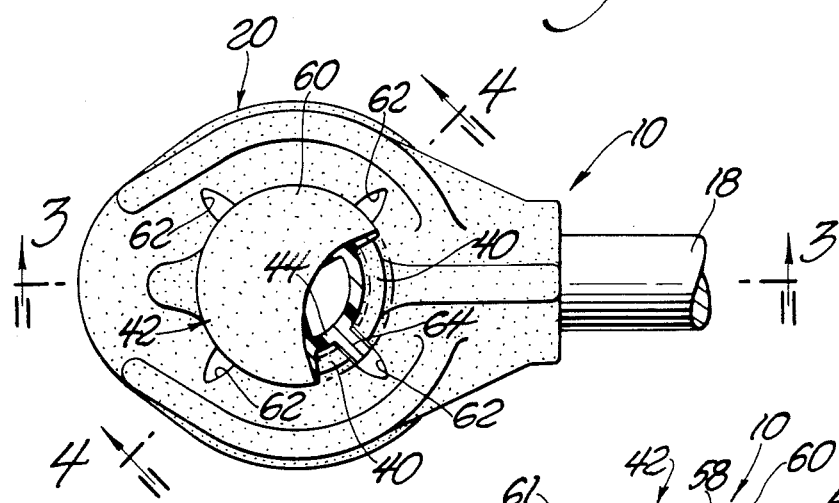
FIG. 2 is an enlarged fragmentary plan view of the instant invention partially broken away.
Figure 3:
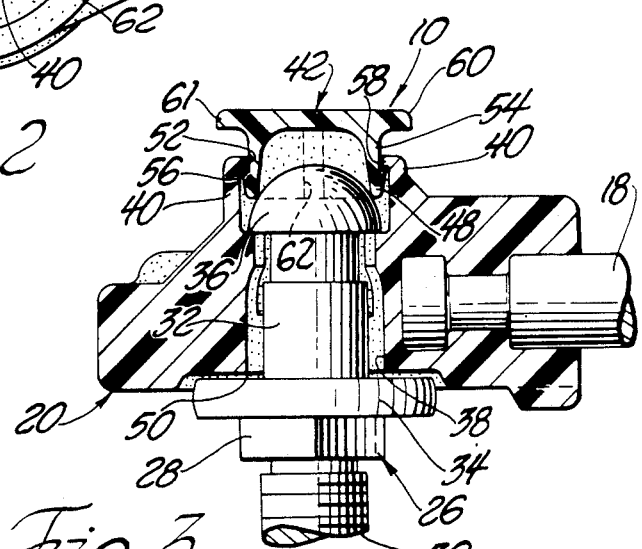
FIG. 3 is a cross sectional view taken substantially along lines 3—3 of FIG. 2.

The cap member 42 includes a linear guide and anti-rotation means for preventing rotation of the cap member 42 relative to the terminal member 20 and for preventing cocking of the cap member 42. More specifically, the terminal member 20 includes a slot 62 formed between each of the fingers 40. The terminal member 20 includes four slots 62 defining two outward fingers 40 disposed on the line of force and two intermediate fingers 40 therebetween. Each of the intermediate fingers 40 includes an inner surface having the ledge portion 44 extending therefrom. The anti-rotation means includes an arm or rib 64, as shown in FIG. 2, extending radially outwardly from the body portion 54 of the cap member 42 in mating engagement with one of the slots 62. The arm 64 mates with the slot 62, the slot 62 providing a linear guide for the insertion of the cap member 42. This prevents sideways or cocked insertion of the cap member 42. Such improper insertion results in disengagement and loss of the cap member 42. The arm or rib 64 and slots 62 prevent such improper installation.

In operation, an operator would engage the head portion 60 of the cap member 42 to spread the fingers 40 of the terminal member 20 to the disengaged position thereby allowing insertion of the ball pin member 36. Release of the cap member 42 allows the fingers 40 to bias the cap member to the withdrawn position thereby allowing the fingers to maintain the engaged condition to engage the ball pin 36 within the passageway 38.

Experimentation has shown that insertion of the ball pin 36 into the passageway 38 without the assistance of the cap member 42 deforms the ledge portion 44. Use of the cap member 42 significantly retains the integrity of the ledge member 44.

The following experiments were performed showing that the use of an assist cap improves retention after the first installation by an average of 30 Newtons and an average of 23 Newtons after the third.

|   | 1st | | 3rd | |
|---|---|---|---|---|
|   | On | Off | On | Off |
| No Cap Assist - On or Off | | | | |
| N | 32 | 32 | 31 | 32 |
| R | 71/100 | 93/133 | 50/68 | 73/114 |
| X | 86.9 | 108.6 | 58.8 | 85.2 |
| Cap Assist On - No Cap Assist | | | | |
| N | 127 | 35 | 62 | 64 |
| R | 44–67 | 112–168 | 39–58 | 81–121 |
| X | 57.0 | 139.2 | 42.1 | 108.0 |

Table 1 shows the results of an experiment wherein no cap assist was used in inserting or removing a ball pin from a terminal member. N indicates the number of trials, R indicates the range or total spread of the data in Newtons, the numeral indicating the force in Newtons for either insertion under the column ON or removal under the column OFF of the ball pin from the terminal member. X is mean value. Table 2 shows the same experiment wherein a cap assist is used for the insertion of the ball pin and not used for the removal of the ball pin. The data shows that the mean value of the force needed for the insertion of the ball pin is reduced from 86.9 Newtons on the first trial to 57 Newtons. There is also an increase in the force necessary for removal of the ball pin from 108.6 Newtons without a cap assist to 139.2 Newtons. After three insertions and removals, the mean value of the force needed for insertion without the assistance of a cap member is 58.8 Newtons as opposed to 42.1 Newtons when a cap assist is utilized. The force necessary to pull out the ball pin from the terminal member is increased from 85.2 without a cap assist to 108 Newtons with a cap assist. The test data indicates that the use of an assist cap improves retention significantly over long term use of the terminal member.

Thus, the instant invention prevents upside down installation of the ball pin into the terminal member and aids terminal removal and retention by reducing assembly loads 50% and improving retention of the ball pin member within the terminal member.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) of the type for transmitting motion in a curved path, said assembly comprising: guide means (12); core means having a peripheral end and being movably supported by said guide means (12) and extending therefrom to provide a variably extending length of said core means between said guide means (12) and said peripheral end of said core means, said extending length defining a line of force; an integral terminal member (20) for operatively interconnecting said extending length of said core means and a control member (22) of the type having a body portion (32) and a ball pin (36) extending therefrom, said terminal member (20) including a passageway (38) defining an opening having a central longitudinal axis perpendicular relative to said line of force and including a plurality of flexible fingers (40) defining a portion of said passageway (38) and having an engage condition for engaging and retaining the ball pin (36) disposed within said passageway (38) and a disengage condition for releasing the ball pin (36); and characterized by finger spreading means (42) movably mounted within said passageway (38) for reciprocating movement along said central longitudinal axis between an inserted position for radially outwardly spreading said fingers (40) to said disengage condition during insertion and removal of the ball pin (38) and a withdrawn position wherein said fingers (40) are in said engaged position for engaging and retaining said ball pin (36) within said passageway (38).

2. An assembly as set forth in claim 1 further characterized by said fingers (40) including an inwardly protruding portion (44) defining an annular ledge about said passageway (38) for engaging and retaining the ball pin (36) in said engage condition, said finger spreading means (42) outwardly spreading said inwardly protruding portions (44) in said disengage condition.

3. An assembly as set forth in claim 2 further characterized by at least some of said fingers (40) including a frustoconical inner surface (46) adjacent said annular ledge (44), said spreading means (42) having an outer frustoconical surface (48) in sliding mating engagement with said frustoconical inner surface (46) of said fingers (40).

4. An assembly as set forth in claim 3 further characterized by said passageway (38) having a first and second end portion (50,52), said first end portion (50) defining an insert opening for receiving the ball pin (36) therethrough, said spreading means (42) comprising a cap member (42) mounted over said second opening (52) to prevent insertion of the ball pin (38) into said second opening (52).

5. An assembly as set forth in claim 4 further characterized by said terminal member (20) including cap retaining means for retaining said cap member (42) within said second end portion (52) of said passageway (38).

6. An assembly as set forth in claim 5 further characterized by said cap member (42) including a body portion (44) having said outer frustoconical surface and a shoulder (56) extending outwardly therefrom, said cap retaining means including an annular inwardly extending flange (58) about said second end (52) of said passageway (38) for abutting contact with said shoulder (56) for retaining said cap member (42) within said passageway (38).

7. An assembly as set forth in claim 6 further characterized by said cap member (42) including a head portion (60) including a radially outwardly extending annular flange (61).

8. An assembly as set forth in claim 7 further characterized by said body portion (54) comprising a substantially cylindrical flexible wall.

9. An assembly as set forth in claim 4 further characterized by said cap member (42) including linear guide means for preventing cocking of said cap member (42) relative to said terminal member (20).

10. An assembly as set forth in claim 9 further characterized by said terminal member (20) including a slot (62) formed between each of said fingers (44).

11. An assembly as set forth in claim 10 further characterized by said linear guide means including an arm (64) extending radially outwardly from said body portion (54) of said cap member (42) in mating engagement with one of said slots (62).

12. An assembly as set forth in claim 10 further characterized by said terminal member (20) including four slots (62) defining two outward fingers (40) disposed on said line of force and two intermediate fingers (40) therebetween, each of said intermediate fingers (40) including an inner surface having said ledge portion (44) extending therefrom.

* * * * *